United States Patent [19]

Maida

[11] 4,384,777
[45] May 24, 1983

[54] ELECTRIC WIND-UP DEVICE OF A CAMERA

[75] Inventor: Osamu Maida, Tokyo, Japan

[73] Assignee: Nippon Kogaku K.K., Tokyo, Japan

[21] Appl. No.: 263,609

[22] Filed: May 14, 1981

[30] Foreign Application Priority Data

May 23, 1980 [JP] Japan .................................. 55-67947

[51] Int. Cl.³ .............................................. G03B 1/12
[52] U.S. Cl. ................................... 354/173; 354/217
[58] Field of Search ....................... 354/173, 171, 217

[56] References Cited

U.S. PATENT DOCUMENTS

| | | | |
|---|---|---|---|
| 3,783,762 | 1/1974 | Sugimori | 354/173 |
| 4,112,449 | 9/1978 | Akasaka | 354/173 |
| 4,229,091 | 10/1980 | Date et al. | 354/173 |

Primary Examiner—John Gonzales
Attorney, Agent, or Firm—Fitzpatrick, Cella, Harper & Scinto

[57] ABSTRACT

An electric wind-up device for driving a film feed mechanism in a camera after exposure comprises wind-up terminating means for detecting an increase in resistance in the film feed mechanism to stop rotation of a motor when the film has been wound up by one frame or completely drawn out of a magazine, and counter means for counting the exposed frames and generating a count signal when a predetermined number of frames are counted. The wind-up device further comprises means co-operating with the counter means for outputting a motor energizing signal after exposure. The co-operating means outputs the motor energizing signal even when the count signal is not energized.

3 Claims, 4 Drawing Figures

ELECTRIC WIND-UP DEVICE OF A CAMERA

BACKGROUND OF THE INVENTION

1. Field of the Invention

This invention relates to an electric wind-up device of a camera.

2. Description of the Prior Art

Motor drive devices having a torque detecting mechanism which senses the terminus of a camera film or detects an increase in torque upon completely drawing the film from the film magazine to automatically de-energize the motor which is operating to draw the film are known, for example, from U.S. Pat. No. 4,112,449 or others.

Upon the increase in torque, a substantial force is instantaneously applied between the perforations of the film and the sprocket of the camera. Some kinds of film may be broken down at the perforations by such a substantial force under a circumstance of low temperature, particularly at temperature of $-10°$ C. or below. In an extreme case, the film may be severed completely such that it cannot be rewound in the magazine.

In order to overcome such problems, it is desirable to use a motor de-energizing means actuated by a counter which can be preset in accordance with the number of film frames to be used, in addition to another motor de-energizing means actuated upon detecting an increase in torque. In this case, the motor can be de-energized by means of the frame counter upon completion of winding up a predetermined number of frames to be used when the camera is used at low temperature or when it is desired to terminate the winding-up after the predetermined number of frames has been used.

On the other hand, there is also known a method in which the film is automatically rewound by utilizing the wind-up motor in the motor drive device. In such a method, one-way clutches are provided at the respective inputs of gear trains for wind-up and rewind so that the gear trains can be automatically switched from one to another by selecting the rotational directions in the motor. However, this method is not very appropriate in that it requires a complicated switch means for changing over the rotational directions in the motor and an expensive structure having large size as well as less durability.

Another method utilizes a rewind lever or the like which can be operated externally to switch a clutch mechanism in such a manner that gear trains for wind-up and rewind can be individually driven without reversing the motor. The last-mentioned method provides an inexpensive structure having smaller size and increased durability.

If an automatic rewind device including the last-mentioned clutch mechanism is combined with the motor drive device utilizing the two motor de-energizing means above-mentioned in such a manner that either of these de-energizing means can be selected to terminate the wind-up of film, there is an inconvenience in such an operation mode that the motor is de-energized upon counting a predetermined number of film frames. If the motor is de-energized to terminate the wind-up of film at the terminus thereof upon detecting an increase in torque, the clutch switching mechanism in the motor drive device will not in any case be affected by the reaction in the camera because of de-energizing the motor. However, if an operation mode in which the motor is de-energized upon counting a predetermined number of film frames is selected, the de-energization of the motor due to the torque detecting mechanism cannot be caused when the mechanical phase in de-energizing the motor does not coincide with the torque detecting phase, so that the wind-up operation will be terminated and will cause a frictional force between the power transmitting surfaces in the clutch mechanism under the reaction in the camera resulting in larger operating force or uncomfortable feeling in switching the clutch.

SUMMARY OF THE INVENTION

It is an object of the present invention to provide an improved motor drive device which can selectively be de-energized by either a torque detecting means or a film-frame counter and particularly to provide such a motor drive device which can overcome the above-mentioned disadvantages in the prior art. That is, the present invention permits selection of a mode wherein the normal frame-by-frame advancement of film may selectively be terminated in response to a film-frame counter. The further wind-up of the film is prevented by blocking the reset of a motor energizing circuit to prevent in turn any further motor operation.

The present invention will be fully apparent from the following detailed description thereof taken in conjunction with the accompanying drawings.

DESCRIPTION OF THE PREFERRED EMBODIMENT

Figure 1:
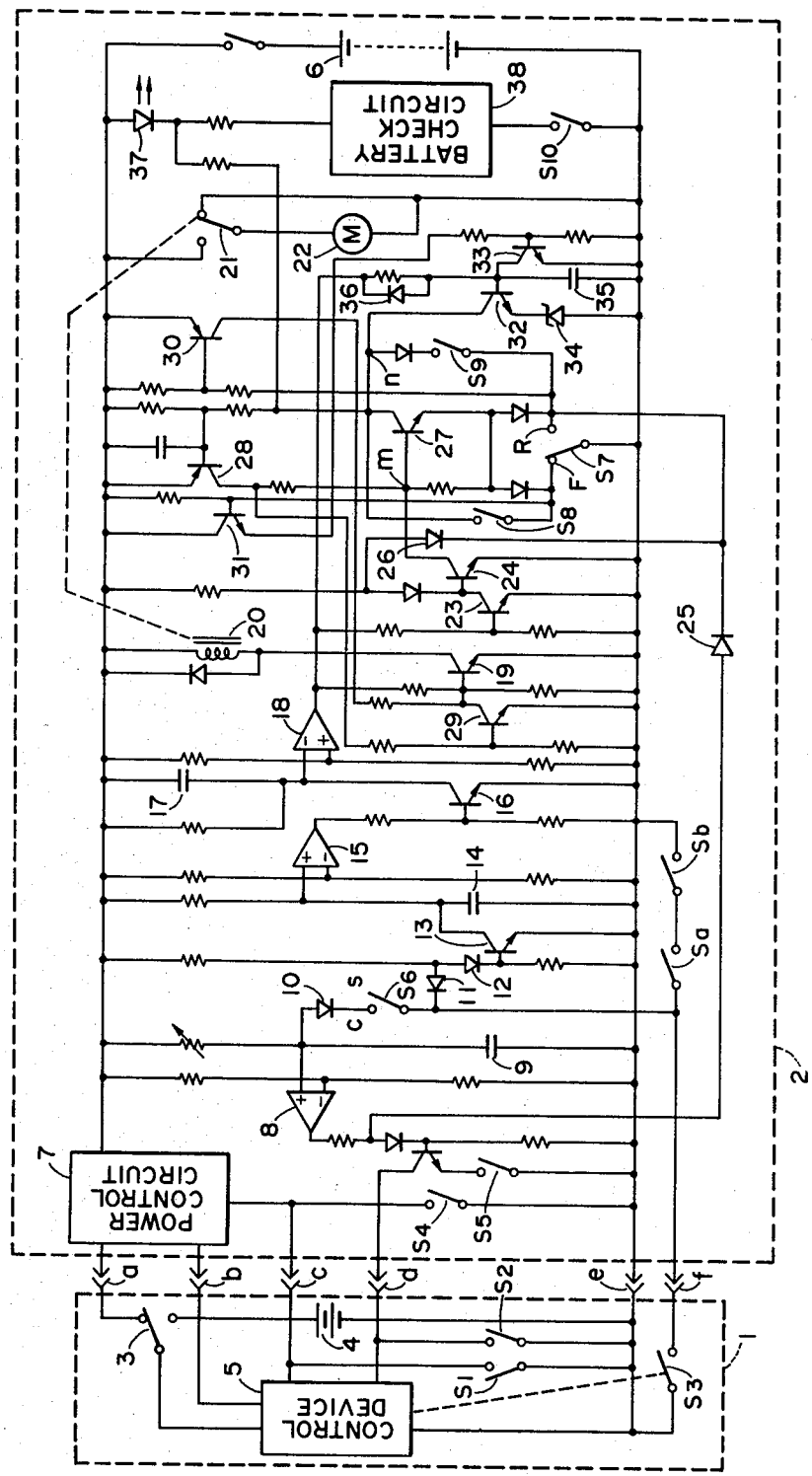
FIG. 1 is a circuit diagram showing an electric wind-up device which is an embodiment of the present invention.

A preferred embodiment of the present invention will be described in connection with the accompanying drawings. FIG. 1 shows a camera which comprises a body 1 and a motor drive device 2 removably mounted thereon. The camera body 1 includes a switch 3 adapted to automatically switch a control device 5 from a power supply 4 contained in the camera body 1 to another power supply in the motor drive device 2 when the latter is mounted on the camera body. A switch $S_1$ is of the half-push type which is operable to be closed as a shutter button (not shown) on the camera body is depressed halfway. The control device 5 includes a light metering circuit, an exposure control circuit, a display circuit, a shutter device, a shutter starting device or, or other functional devices in accord with the conventional manner. Among these components, the light metering circuit and the display circuit are actuated upon closing of the switch $S_1$ to display a pre-arranged exposure adjustment value or the like. The shutter starting device used herein is one which attains the opening of the shutter, etc. If a focal-plane shutter is used as shown in the embodiment, then means for releasing a forward curtain corresponds to this shutter starting device.

When the shutter button is further depressed, a release switch $S_2$ transmits a release signal to the control device 5 for causing the shutter starting device to release the shutter.

A motor energizing switch $S_3$ is adapted to be closed between a point of time at which the aperture of a rearward curtain in the focal-plane shutter begins to be closed and another point of time at which the rearward curtain is completely closed, that is, exposure is completed. The motor energizing switch $S_3$ can be opened upon completion of film advance and shutter charge.

In this connection, the control device 5 controls the circuitry in such a manner that when it is wanted to release the shutter again after the release switch $S_2$ has been turned on to release the same, the switch $S_2$ must be once turned off and then on.

The camera body 1 and the motor drive device 2 are coupled together electrically by means of electric contacts a, b, c, d, e and f and mechanically by means of a mechanical coupling means (not shown), such as wind-up coupling and rewind coupling. The motor drive device 2 includes a power supply 6, a power control circuit 7 including a constant voltage circuit for controlling the camera, a half-push switch $S_4$ and a release switch $S_5$. When a shutter button (not shown) on the motor drive device is depressed halfway, the half-push switch $S_4$ is closed to energize the power control circuit 7 so that electric power will be supplied to the control device 5 of the camera body 1 through the contact a. At the same time, the switch $S_4$ transmits an ON signal to the control device 5 through the contact c to energize various components therein, for example, the metering circuit for displaying a pre-selected exposure adjustment value. Such a state is maintained by a hold signal which is being transmitted from the control device 5 through the contact b to the power control circuit 7 for a predetermined period of time even if the half-push switch $S_4$ is opened. In the meantime, the photographer can see the display of the pre-selected exposure adjustment value, etc. When the shutter button is further depressed, the release switch $S_5$ is closed.

A release timing circuit is constituted of a comparing circuit 8, a capacitor 9 and resistors. This release timing circuit serves to hold the biased state of a transistor connected to one end of the release switch $S_5$ during opening of a selector switch $S_6$ for photographing in one-frame and continuous modes and for biasing said transistor each time the motor energizing switch $S_3$ is opened upon completion of film advance during closing of the selector switch $S_6$ to charge the capacitor 9. Every time it is turned on, the transistor connected to the one end of the release switch $S_5$ transmits a release signal to the control device 5 through the contact d to cause the shutter starting device to release the shutter.

A wind-up delaying circuit adapted to be energized upon closing of the motor energizing switch $S_3$ and to output a wind-up signal after a predetermined period of time has elapsed, that is, after completion of exposure, is constituted of diodes 11 and 12, a transistor 13, a capacitor 14, a comparing circuit 15, a transistor 16 and resistors. A capacitor 17, a comparing circuit 18 and resistors constitute motor stoppage delaying circuit for receiving the wind-up signal from the wind-up delaying circuit and then immediately outputting a motor driving signal. This motor stoppage delaying circuit continues to output the motor driving signals for a predetermined time period even after the motor energizing switch $S_3$ is opened upon completion of film advance so that the wind-up signal is no longer received.

A transistor 19 is adapted to be turned on by the motor driving signal to supply power to a relay coil 20. When the relay coil 20 is energized, a relay contact 21 is switched on to rotate a motor 22.

A positive feedback circuit is constituted of transistors 27 and 28, resistors and a capacitor. This positive feedback circuit in this embodiment is a latch circuit for outputting a motor stop signal upon detection of a torque after completion of the film advance which will hereinafter be described.

A reset circuit for resetting the latch circuit is constituted by transistors 23 and 24.

A selector switch $S_7$ is provided for selecting either wind-up or rewind mode. The selector switch $S_7$ is in the wind-up operation mode when it is closed at the side of contact F whereas it is in the rewind operation mode at the side of contact R. A normally opened torque switch $S_8$ is provided as will be described hereinafter and adapted to be momentarily closed and then immediately opened upon detecting an increase in wind-up torque at the completion of the film advance or at the termination of the film. A rewind stop switch $S_9$ is provided as be closed when the film is all rewound into disengagement with a sprocket. This switch is opened when a new unexposed film is placed on the sprocket and a back lid is closed. The rewind stop switch $S_9$ is attached to the back lid of the camera and electrically connected with the motor drive device through a contact (not shown).

A protective timer circuit is constituted of a transistor 32, a Zener diode 34, a capacitor 35, a diode 36 and resistors. This circuit serves as one for triggering the latch circuit and de-energizing the motor when a predetermined time period for which the motor is supplied with power elapses. This prevents the motor from being burnt or the power supply from being wastefully consumed by the fact that the electric current continues to flow to the motor when the torque switch $S_8$ fails or when the voltage drops to render the torque switch $S_8$ inoperative. If a battery check switch $S_{10}$ is closed and when the source voltage exceeds a prescribed level, a battery check circuit 38 drives LED 37 through a resistor to turn on it.

A switch Sa is controlled by a preset type film-frame counter described hereinafter. The switch Sa is turned on as a predetermined number of film frames is counted by the above counter. A switch Sb is turned on manually to select such a mode that the wind-up of film is terminated.

Such a circuitry is operated as follows. It is assumed that the switch Sb is turned off to select such a mode that the wind-up operation is terminated upon detecting an increase in torque. Description will first be made of a case where the motor drive device has been mounted on the camera body, the switch $S_6$ has been set at position S (OFF . . . one-frame photographing) and the switch $S_7$ has been set at position F (wind-up). Before the shutter is released, the switch $S_6$ is in OFF position and therefore the capacitor 9 is charged. The comparing circuit 8 causes the transistor connected with one end of the switch $S_5$ to biased. Also, the motor energizing switch $S_3$ is in OFF position and the transistor 13 is biased to its ON state. Consequently, the capacitor 14 of the wind-up delaying circuit is discharged and the output of the comparing circuit 15 has become low, so that the transistor 16 is in its OFF state and the capacitor 17 of the motor stoppage delaying circuit is discharged through a resistor connected in parallel to the capacitor 17 and the output of the comparing circuit 18 has become low. As a result, the transistor 19 is in its OFF state and the motor has been de-energized. The transistor 23 also is in its OFF state while the transistor 24 is turned on. Accordingly, both the transistors 27 and 28 of the latch circuit are in OFF state. That is, the latch circuit is in its reset condition. Further, the torque switch $S_8$ is in its OFF position.

In such a condition, when the shutter button (not shown) provided on the motor drive device is depressed to close the switches $S_4$ and $S_5$, the transistor connected with one end of the switch $S_5$ is turned on because it is biased by the comparing circuit 8, and the release signal is transmitted to the control device 5. When the shutter starting device is energized to release the shutter, an exposure is effected and the rearward shutter curtain commences to close. The motor energizing switch $S_3$ is closed in response to closing of the shutter before the rearward shutter curtain completely closes the aperture. When the switch $S_3$ is closed, the bias voltage of the transistor 13 is clamped by the diode 11. Therefore, the transistor 13 is turned off to permit the capacitor 14 to commence charging. When a predetermined time period required to cause the rearward shutter curtain to completely close the aperture elapses, the output of the comparing circuit 15 is changed to high to turn on the transistor 16. As a result, the wind-up delaying circuit will output a wind-up signal. When the transistor 16 is turned on, the capacitor 17 is momentarily charged and the output of the comparing circuit 18 is changed to high. That is, the motor stoppage delaying circuit will output a motor driving signal. At this point, the transistor 23 is turned on while the transistor 24 is turned off to make the latch circuit operative. However, since there is no trigger input of the latch circuit, the transistors 27 and 28 are still in OFF state and the transistor 29 also remains in OFF state. Accordingly, the transistor 19 receives the output of the comparing circuit 18 and is turned on. The relay coil 20 is electrically energized to rotate the motor 22 whereas the capacitor 35 of the protective timer circuit begins to be charged through a resistor connected in parallel to the diode 36.

Film advance is effected by the rotation of the motor through a wind-up coupling (not shown). Since the start of the motor 22 is delayed by a predetermined time period determined by the wind-up delaying circuit after the motor energizing switch $S_3$ has been turned on, the film is advanced after the rearward shutter curtain has completely closed the aperture, that is, after the exposure has been completed. When the film advance effected by the motor 22 is completed, the motor energizing switch $S_3$ is then opened to turn on the transistor 13 so that the capacitor 14 is momentarily discharged and the output of the comparing circuit 15 is changed to low to turn off the transistor 16. However, even if the transistor 16 is turned off, the capacitor 17 is discharged little by little through a resistor connected in parallel thereto. Therefore, the output of the comparing circuit 18 is not immediately varied but maintains its high state for a predetermined period of time after the switch $S_3$ has been opened and at least until the latch circuit is operated as will be described. The motor 22 continues to rotate with the transistor 19 remaining in ON state.

When the film advance is completed, a film advance device such as a sprocket (not shown) in the camera body is retained immovably, but the motor continues to rotate. As a result, the wind-up torque will be increased. This is detected by a torque detecting mechanism as will be described to momentarily close the torque switch $S_8$. At this point of time, a trigger signal is applied to a junction n to trigger the latch circuit and to turn on the transistor 27 and 28. That is, a motor stopping signal is generated. Thus, the transistor 29 is turned on and, in spite of the fact that the output of the comparing circuit 18 is high, the transistor 19 is turned off to cut off the power supply to the relay coil 20 for de-energizing the motor forcibly. After the latch circuit has been triggered by the switch $S_8$, the discharging of the capacitor 17 progresses and the output of the comparing circuit 18 is changed to low level to turn off the transistor 23 and to turn on the transistor 24. As a result, a reset signal is applied to a junction m to reset the latch circuit. At this point, the transistors 27, 28 and 29 are turned off and the transistor 19 maintains its OFF state. The above predetermined time period required until the output of the comparing circuit is reversed is equal to or slightly larger than a time period passed after the film advance in the camera has been completed at the lowest voltage allowable for the specification of the motor drive device until the torque switch $S_8$ is closed.

The protective timer circuit constituted of the transistor 32, Zener diode 34, capacitor 35, diode 36 and resistors is inoperative for the normal wind-up period. When the output of the comparing circuit 18 is changed to low, the charge stored in the capacitor 35 is rapidly discharged through the diode 36.

When the latch circuit is in operation, that is, for a time period after the torque switch $S_8$ has been closed until the output of the comparing circuit 18 is reversed to reset the latch circuit, the LED 37 is turned on to enable it to be monitored that the torque switch $S_8$ is properly in operation. In such a manner, the photographing of one film frame has been terminated and the next frame in the film has been advanced. Even if the shutter button (not shown) of the motor drive device remains depressed, the transistor connected to one end of the switch $S_5$ maintains its ON position. Therefore, the next release signal is not applied to the control device 5.

Description will now be made of a case where the switch $S_6$ has been brought into position C (ON ... a continuous photographing mode).

When the switch $S_6$ is in ON position, a photograph of one frame is taken and the next frame in the film is advanced in the same manner as previously described. However, when the motor energizing switch $S_3$ is in ON position, the capacitor 9 is discharged through a reverse current blocking diode 10 and a contact f. Accordingly, the output of the comparing circuit 8 is changed to low level and the transistor connected with this output is once turned off. When the motor energizing switch $S_3$ is opened upon completion of the film advance, the capacitor 9 again commences to be charged and, after a predetermined time period, for example, after the motor 22 has been de-energized, the output of the comparing circuit 8 constituting a release timing circuit is changed to high. If the release switch $S_5$ is in its ON position at that time, the transistor biased by the output of the comparing circuit is turned on to again transmit the release signal to the control device 5, thereby effecting the shutter release and the continuous photographing operation. By controlling a variable resistor for charging the capacitor 9 which determines the release timing, the speed in the moving film during the continuous photographing operation can be determined as desired.

When the film reaches its terminus in progress of the film wind-up operation, the wind-up device in the camera body can no longer draw the film out of the magazine. Due to the stoppage of the sprocket, the wind-up device usually becomes immovable before the film advance is completed. However, even if the wind-up device is stopped, the motor energizing switch $S_3$ is in ON position energizing the motor 22. Thus, the torque switch $S_8$ is operated under a resulting increase in torque to momentarily close itself so that the latch circuit will be triggered to de-energize the motor 22. Since the switch $S_3$ remains in ON position, the output of the comparing circuit 8 is maintained high and the transistor 24 of the reset circuit is maintained at OFF state. Further, the transistors 27 and 28 of the latch circuit also are held at ON state. Accordingly, all the stages in the sequence are terminated with the LED 37 turned on continuously to display that the film has come to its terminus.

In a case where the torque switch $S_8$ becomes inoperable due to an insufficient motor driving force resulting from the source voltage drop at the termination of the film or where the torque switch $S_8$ fails, the protective timer circuit causes the transistor 32 to turn on, the latch circuit to be triggered, and the transistor to turn on in succession when the charging potential of the capacitor 35 exceeds the threshold voltage determined by the voltage of the Zener diode 34 and the base-emitter voltage of the transistor 32 after a predetermined time period from the point of time at which the switch $S_3$ is closed, thereby de-energizing the motor 22 and turning on the LED 37.

The rewind of film will now be described. The film rewind is accomplished by closing the switch $S_7$ at the side of contact R. This is carried out as follows. When a lever for selecting the wind-up and rewind modes (not shown) is moved from the wind-up position to the rewind position, a drive gear is first disengaged from a wind-up gear train. Subsequently, the switch $S_7$ is moved from the contact F to the neutral position. Thereafter, a rewind button (not shown) provided in the camera body is actuated to make the sprocket free. The switch $S_7$ is further moved from the neutral position to the contact R. Thus, the drive gear will be coupled to the rewind gear train to enable the rewind to take place. These stages are successively attained only by moving the selecting lever to the rewind mode position. The selection of wind-up mode may be effected by reversing the above order of steps. The switching operation to the rewind may be accomplished in two cases, namely, in a case where the motor 22 is de-energized before the wind-up operation is completed and in a case where the motor is de-energized after the wind-up operation has been completed. The rewind prior to the completion of wind-up mode is carried out in the following manner.

As previously described, at the termination of the film, it is often the case that the camera is de-energized with the wind-up operation not yet completed. In such case, the motor energizing switch $S_3$ is in ON position, the output of the comparing circuit 18 is high, and the transistors 27 and 28 of the latch circuit are turned on under the influence of the torque switch $S_8$. At this time, if the selecting lever is moved to cause the switch $S_7$ to move from the contact F to the neutral position, the transistors 27 and 28 are turned off to reset the latch circuit and also the transistor 29 is turned off to turn on the transistor 19 so that the motor will commence to rotate. At the same time, the transistor 31 is biased to be turned so that the transistor 33 is turned on to cause the capacitor 35 to discharge for resetting the protective timer circuit. The transistor 32 is turned off. At this time, the drive gear meshes with neither the wind-up gear train nor the rewind gear train.

When the switch $S_7$ is connected with the contact R, the latch circuit is ready for operation, but the rewind stop switch $S_9$ is in OFF position because the film has not yet rewound. Accordingly, the latch circuit will not be triggered. Further, when the selecting lever is completely moved to the rewind position, the drive gear is brought into engagement with the rewind gear train to effect the rewind. When the leading end of the film is disengaged from the sprocket or take-up spool of the camera, that is, when the rewinding of film is terminated, the rewind stop switch $S_9$ is closed to apply a trigger signal to the junction n and trigger the latch circuit. Thus, the transistor 29 is turned on so that the transistor 19 is turned off to de-energize the motor and turn on the LED 37 for displaying the termination of rewind. In such a condition, even if the back lid is opened to remove the exposed film from the camera and the rewind stop switch $S_9$ is opened, the once triggered latch circuit remains in operation so that the motor 22 will not be rotated. Where the system is designed such that, for example, the rewind coupling can be retracted from the magazine chamber during film advance and returned into the magazine chamber during rewinding in response to the action of the selecting lever, if the selecting lever is moved to the wind-up position to remove the magazine from the chamber after the termination of rewind and the rewind coupling is retracted from the magazine chamber, the switch $S_7$ will be connected to the contact F. In such a designed system, the latch circuit may be reset when the switch $S_7$ has been brought to its neutral position. The motor energizing switch $S_3$ remains in its ON position. Therefore, tor motor 22 is driven until the wind-up operation is completed. At the termination of the wind-up operation, the motor is de-energized, but by this time, the rewind has already been completed and the engagement between the sprocket and the performations of the film has been released. Thus, the exposed film is not drawn out of the magazine. Thereafter, an unexposed film may be charged in the magazine.

Rewind effected upon de-energizing the motor with the camera having completed the wind-up operation will be described.

Since the wind-up operation has been completed, the motor energizing switch $S_3$ is in OFF position and the output of the comparing circuit 8 is low. Even if the selecting lever is moved to the rewind position and the switch $S_7$ is disengaged from the contact F, the transistor 19 is turned off by the output of the comparing circuit 18 at this time and therefore, the motor 22 is not yet rotated. When the switch $S_7$ is connected to the contact R, the transistor 30 is turned on and the transistor 19 is turned on so that the motor commences to rotate. At the same time, the bias of the transistor 24 is clamped by the diode 26 so that the transistor 24 is turned off to make the latch circuit operable. When the wind-up and rewind selecting lever is completely positioned in the rewind position, the drive gear is brought into engagement with the rewind gear train as previously described. The subsequent operation steps are the same as previously described. When the selecting lever is returned to its initial position and the switch $S_7$ is disengaged from the contact R after the termination of rewind, the latch circuit is reset because the camera is in the wind-up completed condition and at the same time the transistor 30 is turned off, so that the bias source of the transistor 19 becomes exhausted and the motor is held inoperative. Such condition remains unchanged even if the switch $S_7$ is connected to the contact F.

The above-mentioned device is designed such that when the rewind is being carried out with the switch $S_7$ brought into engagement with the contact R, the bias of the transistor connected to the output of the comparing circuit 8 is clamped by the diode 25, thereby preventing the release signal from being transmitted to the camera body even if the release switch $S_5$ is closed.

The mode in which the preset type film-frame counter is actuated by opening the switch Sb to stop the wind-up operation will now be described.

The switch Sa is in OFF position until a predetermined number of film frames is counted by the counter. Accordingly, the camera is operated in the same manner as previously described, in either of the one-frame or continuous mode for photographing. In respect to this, therefore, further description will be omitted. When the film-frame counter is used for preventing any break-down in the film at low temperature, the counter is necessarily preset such that the wind-up operation will be terminated before the film cannot be drawn out of the magazine.

As previously described, when a preset number of frames are exposed, the counter switch Sa is turned on. The counting is made during rotation of the motor between the initiation of wind-up and the turn-on of the torque switch $S_8$ due to the termination of wind-up for one frame. Accordingly, the counter switch Sa is turned on upon having used the film frames in the preset number before the torque switch $S_8$ is turned on. At a point of time that the counter switch Sa is turned on, the motor is being rotated to continue the wind-up of the film since, as shown in FIG. 1, the counter switch Sa is connected in parallel with the motor energizing switch $S_3$ of the camera body 1. Upon winding-up one frame in the film, the wind-up device in the camera body is made inoperative as described hereinbefore so that the continued rotation of the motor will increase the wind-up torque to actuate the torque detecting mechanism to momentarily turn on the torque switch $S_8$. This is the same as in the case where an increase in torque is detected during winding-up to turn on the torque switch $S_8$ as aforementioned. Therefore, the winding-up is stopped and the LED 37 is continuously lighted to indicate that the terminus of the film is detected and that all steps in sequence are terminated. Thereafter, the rewinding may be carried out in the same manner as previously described. In the present embodiment, the motor energizing switch $S_3$ is opened immediately after the counter switch Sa has been closed. This has no influence on the motor stopping step effected under the influence of the switch $S_8$.

Figure 2:
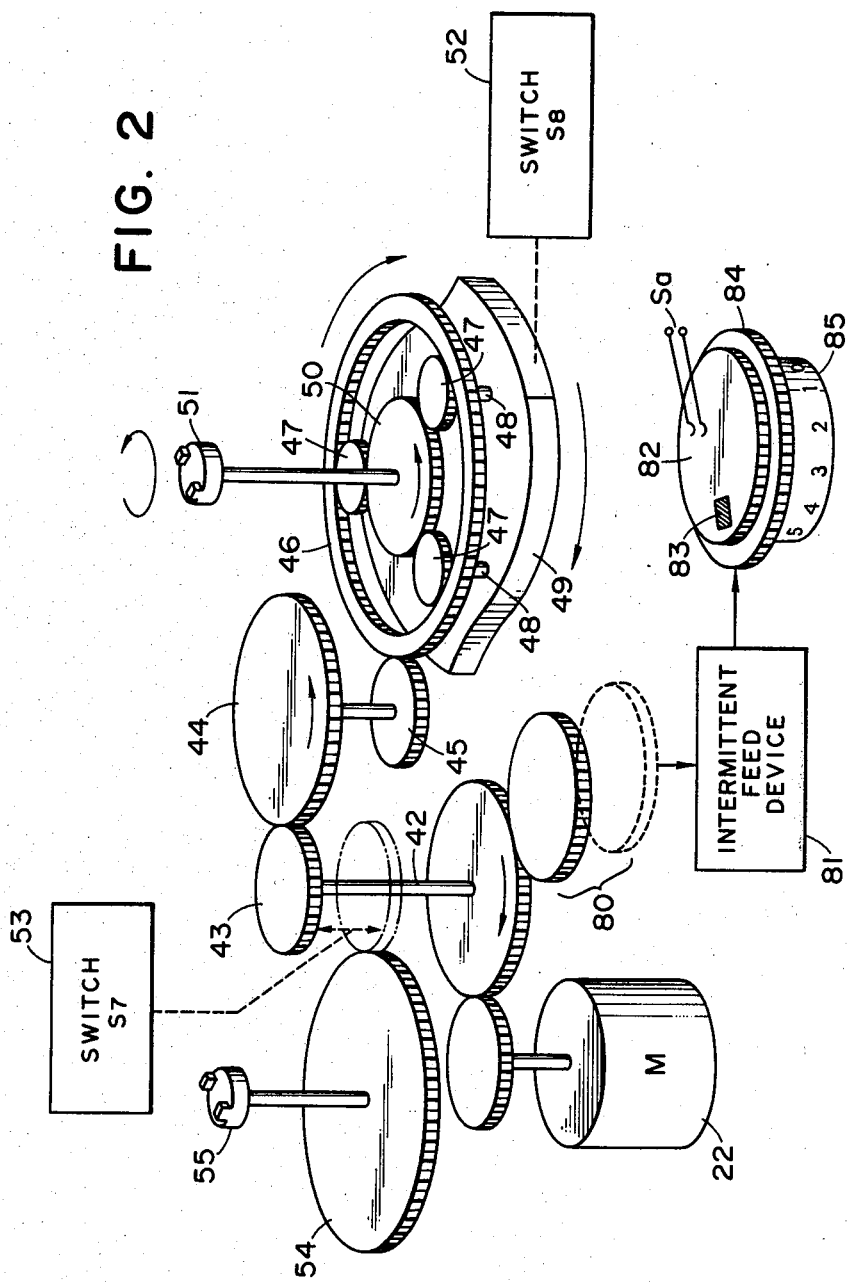
FIG. 2 is a perspective view showing an example of the mechanism for operating a torque switch.
Figure 3:
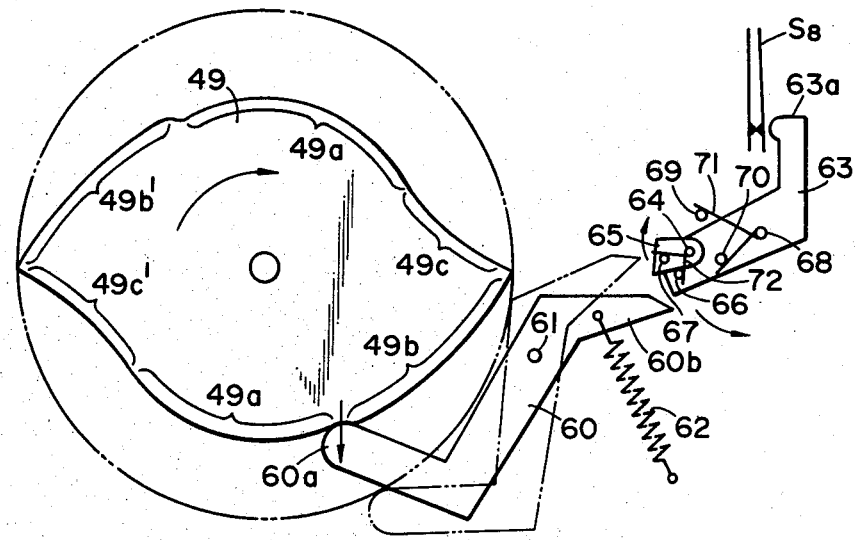
FIG. 3 is a plan view showing a specific form of the torque detecting mechanism.
Figure 4:
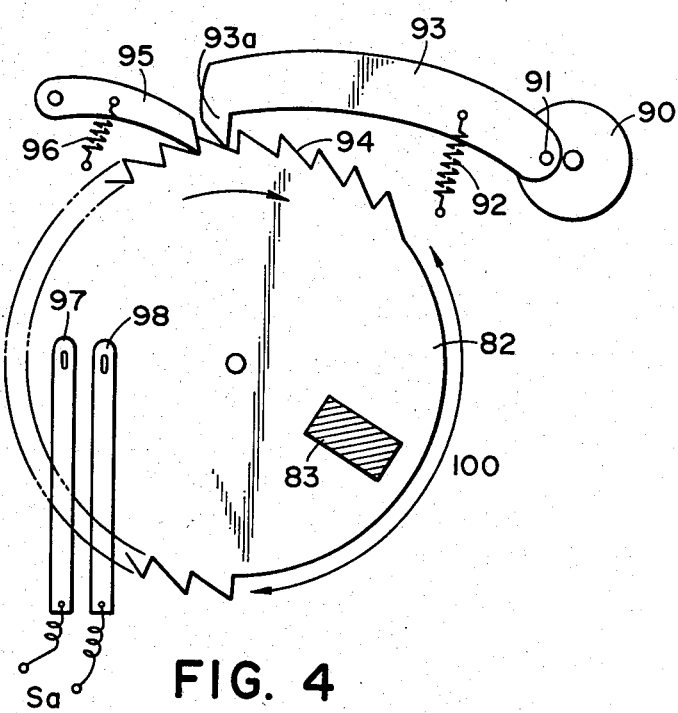
FIG. 4 is a plan view showing a specific form of means for operating a preset counter.

FIGS. 2 to 4 show an example of the mechanism for controlling the torque switch $S_8$ and counter switch Sa in the circuitry described in connection with FIG. 1. In FIG. 2, an axially slidable gear 43 is provided on a shaft 42 driven by a gear 41 which is normally engaged by a motor pinion. The gear 43 is rotatable with the shaft 42 and positioned axially by the wind-up and rewind selecting lever which actuates the switch $S_7$. The gear 43 is shown by a solid line at its wind-up position in which it is engaged by a gear 44. When the rewind mode is chosen, the gear 43 is shifted to a position shown by a phantom line in which it is engaged by a gear 54 to transmit the driving force to a rewind coupling 55 which is connected with the rewind device (not shown) in the camera body. When the gear 43 is moved from its solid-line position to its phantom-line position and disengaged from the gear 44, the switch $S_7$ is moved away from the contact R in FIG. 1. Before the gear 43 is engaged by the gear 54, the switch $S_7$ is connected with the contact R.

The driving force transmitted between the gears 43 and 44 is further transmitted through gears 45, 46, 47 and 50 to a wind-up coupling 51 which is connected with the wind-up device (not shown) in the camera body. The gear 46 has external teeth engaging with the gear 45 and internal teeth engaging with the gear 47. The shafts 48 of the gears 47 are supported by a cam plate 49 formed coaxially with the gears 46 and 50. The gears, 46, 47 and 50 together constitute a planetary gear mechanism.

A cam is formed on the end surface of the cam plate 49. This cam is in contact with a torque detecting mechanism 52 which actuates the torque switch $S_8$. When the gear 43 is in engagement with the gear 44, the rotation of the motor 22 is transmitted to the gear 46 to rotate it clockwise. As a result, the gear 50 and thus the coupling 51 are driven counter-clockwise through the gear 47 and the cam plate 49 is driven clockwise through the shafts 48. During the wind-up operation, the rotational force of the gear 44 is divided into a component for driving the coupling 51 and another component for driving the cam plate 49. Among them, smaller rotational force is transmitted to the cam plate 49. As such smaller force is being applied to the cam plate 49, the torque detecting mechanism 52 may neglect it. When the sprocket is stopped in rotation due to the completion of the film advance to arrest the rotation of the wind-up coupling 51, the rotational force is increased in the cam plate 49. This increased force is detected by the torque detecting mechanism 52 to actuate the torque switch $S_8$.

For a period of time between the beginning and termination of the wind-up operation, a ratchet wheel 82 is rotated through a given angle by an intermittent feed device 81 through an idle gear train 80 engaging with the gear 41 before the torque switch $S_8$ is turned on. The ratchet wheel 82 has an electrically insulated top surface on which a contact 83 is provided for turning on the counter switch Sa. On the bottom surface of the ratchet wheel 82 is provided a knob portion 84 for manually setting the preset type counter. The knob 84 is partially protruded externally from the motor drive device. The knob 84 includes a dial disc 85 disposed on the underside thereof for externally confirming the preset number of frames.

The ratchet wheel 82, knob 84 and dial disc 85 are together rotated. The ratchet wheel 82 is free to rotate in one direction so that a desired number of frames can be preset by rotating the knob 84 in said one direction to align the desired numeral indication on the dial disc 85 with a fixed mark (not shown) on the motor drive device.

A specific example of the torque detecting mechanism 52 will now be described with reference to FIG. 3. The cam surface of said cam plate 49 has arcuate portions 49a and 49a' each having a small radius of curvature and cam portions 49b, 49b', 49c and 49c'. A first lever 60 is in contact with the cam surface and rotatable about a pivot 61. The lever 60 is biased clockwise by means of a spring 62 connected therewith at one end so that the proximal end 60a of the first lever is brought into contact with the cam plate 49. A second lever 63 is rotatable about a pivot 68. A spring 71 is located between a spring engaging pin 70 and stop pin 69 on the second lever. The second lever 63 is biased clockwise by the spring 71 and engaged by the stop pin 69. A third lever 65 is rotatable about a shaft 64 on the second lever and biased counter-clockwise by means of a spring 72 which is located between a spring engaging pin 67 on the third lever and a stop pin 66 on the second lever. The movement of the third lever 65 is limited by the stop pin 66. The proximal end of the third lever and the distal end 60b of the first lever are engageable with each other. The distal end 63a of the second lever 63 is adapted to close the torque switch $S_8$ when this lever is rotated counter-clockwise.

FIG. 3 shows, by a solid line, the first lever 60 which is positioned in progress of the film advance in the camera. In the position of the first lever 60, a clockwise rotational force is being transmitted to the cam plate 49. However, since the rotation of the cam plate 49 is arrested by the engagement between the raised portion of the cam formed between the portions 49a and 49b and the proximal end 60a of the first lever biased by the spring 62, the wind-up coupling 51 is only rotated to advance the film. When the wind-up device including the sprocket and others is stopped at the completion of the film advance, the coupling 51 also is stopped in rotation. Therefore, the rotational force transmitted to the cam plate 49 is sharply increased resulting in a force larger than the retaining force of the first lever 60. Thus, the cam plate 49 commences to rotate clockwise to rotate the first lever 60 counter-clockwise. At this time, the first lever 60 is rotated through a maximum extent to a position shown by a dot-dash line. For a period of time that the first lever is driven to the dot-dash line position, the distal end 60b thereof interferes with the proximal end of the third lever 65. However, the second lever 63 is retained by the stop pin 69 to be made immovable. The third lever 65 is only rotated clockwise. The arrangement is such that the distal end 60b of the first lever and the proximal end of the third lever 65 pass through the interference area before the first lever reaches its dash-dot line position. Accordingly, the third lever returns to a position in which it is again engaged by the stop pin 66, with the aid of the spring 72.

When the cam plate further continues to rotate to bring the proximal end 60a of the first lever into contact with the cam portion 49c, the first lever 60 is rotated clockwise by means of the spring 62. The distal end 60b of the first lever again interferes with the proximal end of the third lever. This tends to move the third lever counter-clockwise. However, the rotation of the third lever 65 is arrested by the stop pin 66 and therefore, that force also rotates the second lever 63. Consequently, the torque switch $S_8$ is closed by the distal end 63a of the second lever to de-energize the motor 22 as previously described. However, even if an electromagnetic brake is applied to the motor 22, it is not momentarily stopped and continues to rotate by a slight amount, whereby the proximal end 60a of the first lever 60 is brought into contact with the arcuate portion 49a' having the same radius of curvature as that of the arcuate portion 49a. Also, during the period that the proximal end 60a returns to the position in which it contacts with the arcuate portion 49a', the distal end 60b passes through the interference area with respect to the proximal end of the third lever 65. Thus, the second lever is retained by the stop pin 69 as shown.

Consequently, the torque switch $S_8$ is returned to its open position. In this condition, if the release button has not been depressed, the motor is de-energized. Thereafter, if the shutter is released for exposure, the motor energizing switch $S_3$ is closed and the rotational force is again transmitted to the cam plate 49. During advancing of the film, the proximal end 60a of the first lever 60 slides on the arcuate portion 49a' of the cam plate. As described hereinbefore, the cam plate 49 is brought into engagement with the proximal end 60a of the first lever 60 at the boundary between the portions 49a' and 49b'.

After the completion of the film advance, when the rotational force in the cam plate 49 is increased, it is again rotated clockwise from the position shown in FIG. 3.

FIG. 4 shows an example of the arrangement including the intermittent feed device, ratchet wheel 82 and counter switch Sa as shown in FIG. 2.

A disc 90 is driven through a full revolution from the idle gear train 80 in a cycle from a time point that the motor 22 commences to rotate for initiating the wind-up operation to another time point that the wind-up operation is terminated to turn on the torque switch $S_8$. As the disc 90 is rotated through a full revolution, a feed lever 93 is reciprocated by an eccentric pin 91 in the left- and right-hand directions as viewed in FIG. 4. The feed lever includes a feed pawl 93a at the tip thereof. The lever 93 is biased by a spring 92 to bring the feed pawl 93a into engagement with the teeth 94 of the ratchet wheel 82. Thus, the ratchet teeth can be moved clockwise one by one during each reciprocation of the lever 93.

A latch pawl 95 is biased clockwise by a spring 96 to engage with the ratchet teeth 94. When the feed pawl 93a is moved in the left-hand direction as viewed in this figure, the counter-clockwise rotation of the ratchet wheel 82 is arrested by the latch pawl 95. The latch and feed pawls 95 and 93a co-operation to permit the ratchet wheel 82 to rotate clockwise when the knob 84 is rotated for presetting the number of frames to be exposed.

The ratchet wheel 82 has a portion 100 of the periphery which has no tooth. When the feed pawl 93a reaches the no-tooth portion 100, the rotation of the ratchet wheel is interrupted.

The top surface of the ratchet wheel 82 is in contact with electric contacts 97 and 98 which are mounted on the camera body. When the contact 83 on the wheel 82 is engaged by the contacts 97 and 98, a short-circuit is formed between the contacts 97 and 98 to turn on the counter switch Sa. Thereafter, when the latch circuit outputs a motor stop signal, the motor 22 will be energized.

The positional relationship between the switch Sa and the ratchet mechanism is such that the feed pawl 93a is in a position spaced apart by a few ratchet teeth from the no-tooth portion 100 of the ratchet wheel when the contact 83 is engaged by the contacts 97 and 98 whereas the contact 83 is disengaged from the electric contacts 97 and 98 to turn off the counter switch Sa when the feed pawl 93a reaches the no-tooth portion 100. Consequently, when the wind-up operation is terminated by the frame-presetting counter and the gear 43 is shifted to the rewind position, the ratchet wheel 82 is rotated by the gear 41 through a distance corresponding to said a few teeth and then automatically interrupted in rotation at the no-tooth portion 100.

Thereafter, if the frame-presetting counter is manually operated to preset the number of frames, the wind-up operation may be terminated upon counting the preset number of frames in the same manner as above-mentioned.

The switch Sb may be controlled by its own exclusive manipulating member (not shown). This prevents the whole system from being adversely affected accidentaly closing the switch Sa, for example, by carelessly operating the knob 84 of the presetting counter.

In such a manner, the latch circuit continues to output the motor stop signal independently of the motor energizing switch S₃ even if a predetermined number of frames have been counted to terminate the wind-up operation. The latch circuit will never be reset. Consequently, the motor will never be energized even if the shutter is released.

As the wind-up operation is terminated as above-mentioned, the proximal end 60a of the lever 60 is always positioned on either of the arcuate portion 49a or 49a' so that no reaction will be transmitted from the camera body to the clutch mechanism (corresponding to the gear 43 in the illustrated embodiment of the present invention) through the coupling 51. Accordingly, the clutch mechanism can operate smoothly and easily.

I claim:

1. An electric wind-up device for driving a film feed mechanism in a camera after exposure to draw and wind-up a film from a magazine which is charged in said camera, said device comprising wind-up terminating means for detecting an increase in resistance in said film feed mechanism to stop the rotation of a wind-up motor when the film has been wound up by one frame or when the film has been completely drawn out of said magazine, and counter means for counting the exposed frames of the film and for generating a count signal when a predetermined maximum number of frames are counted, the improvement comprising:

circuit means, cooperatively responsive to said count signal, for outputting a motor energizing signal after each exposure; wherein said circuit means is capable of outputting said motor energizing signal even when said count signal is not generated; and means for resetting said wind-up terminating means in response to removal of said motor energizing signal in order to permit subsequent energization of said wind-up motor; wherein said counter means generates said count signal before said increase in resistance in said film feed mechanism is detected, and continues to generate said count signal after the film is wound up by one frame under the influence of said wind-up terminating means to generate said motor energizing signal to prevent said resetting of said wind-up terminating means.

2. An electric wind-up device as defined in claim 1, wherein said wind-up terminating means includes a bi-stable circuit for being switched into a first state to stop actuation of said wind-up motor in response to completion of film wind-up by one frame; wherein removal of said motor energizing signal causes said bi-stable circuit to reset to its second state to permit subsequent operation of said wind-up motor; and wherein the generation of said count signal causes said circuit means to prevent said bi-stable circuit from resetting, thereby preventing any further operation of said wind-up motor.

3. An electric wind-up device as defined in claim 1, wherein said circuit means comprises first and second switches connected in parallel, wherein operation of said first switch is controlled in response to an exposure button on said camera and operation of said second switch is controlled in response to said counter signal.

* * * * *